United States Patent [19]

Cutshall

[11] Patent Number: 4,618,056
[45] Date of Patent: Oct. 21, 1986

[54] LINK CONVEYOR BELT FOR HEAT TREATING APPARATUS

[75] Inventor: Robert S. Cutshall, Kalamazoo, Mich.

[73] Assignee: Omega Castings, Inc., Battle Creek, Mich.

[21] Appl. No.: 592,654

[22] Filed: Mar. 23, 1984

[51] Int. Cl.[4] .................................. B65G 17/06
[52] U.S. Cl. ........................ 198/853; 432/239
[58] Field of Search .................. 198/851–853, 198/822; 474/220, 224, 229; 432/140, 198, 239

[56] References Cited

U.S. PATENT DOCUMENTS

| | | |
|---|---|---|
| 1,529,243 | 3/1925 | Drake et al. |
| 1,626,396 | 4/1927 | Drake |
| 2,681,728 | 6/1954 | Boron |
| 3,824,868 | 7/1974 | Fahrenwald |
| 4,212,384 | 7/1980 | Grube ............................. 198/684 |
| 4,438,838 | 3/1984 | Hodlewsky et al. ............ 198/853 |

*Primary Examiner*—Joseph E. Valenza
*Assistant Examiner*—Lyle Kim
*Attorney, Agent, or Firm*—Flynn, Thiel, Boutell & Tanis

[57] ABSTRACT

A conveyor belt having plural metal links arranged in rows which extend transversely of the belt. The links in adjacent rows are staggered to interfit with one another, and elongated rods extend transversely for joining the links together. The metal link comprises a central tubular body having a hollow interior and defined by top and bottom walls joined together by spaced sidewalls, the top wall being substantially planar and having planar wings which project outwardly beyond the sidewalls. Front and rear hinge portions are defined at opposite ends of the tubular body, and each hinge portion includes a substantially semi-cylindrical end wall which joins to the adjacent ends of the top and bottom walls, and also integrally connects to the adjacent end of the respective sidewall to define a substantially cylindrical, transversely extending opening. The rear hinge portion has a pair of cylindrical trunnions which define an extension of the respective opening, which trunnions project outwardly from the respective sidewalls. The hollow interior of the tubular body is in open communication with the central portion of the openings associated with the front and rear hinge portions.

12 Claims, 8 Drawing Figures

LINK CONVEYOR BELT FOR HEAT TREATING APPARATUS

FIELD OF THE INVENTION

This invention relates to a conveyor belt having a substantially uninterrupted support surface defined by a series of articulated metal links upon which the work to be conveyed is supported and, in particular, to an improved metal link. The conveyor belt of this invention has particular utility in connection with heat treating furnaces wherein the belt is utilized for carrying articles to be heat treated into and out of the furnace.

BACKGROUND OF THE INVENTION

Conveyor belts in which a plurality of metal links are arranged to present a substantially continuous supporting surface have been utilized for many years, particularly in association with furnaces wherein the conveyor belt constitutes a moving support for articles which are to be conveyed into and through the furnace for heat treatment purposes. The conveyor belt conventionally has a plurality of metal links arranged in plural rows which extend transversely of the belt, the links in adjacent rows being staggered to interfit with one another, and elongated connecting rods extend transversely of the belt for hingedly joining the links of adjacent rows. The metal links are cast from high alloy steels so as to withstand the high temperatures experienced in the heat treatment furnace, whereby the links are thus both difficult to cast and costly to manufacture. The pivot rods themselves are also often formed from high alloy steels, and are also costly.

In one conventional conveyor belt assembly of this general type, the metal links are generally of a cruciform shape and have hinge portions at opposite ends, whereby the hinge portions on the links of adjacent rows can be interleafed in substantially the same manner as a piano-type hinge, with an elongated hinge rod extending through the aligned interleafed hinge portions. With this type belt, the hinge rod functions not only to connect the links together, but also as a means for permitting the links to freely pivot and turn during belt movement. Since the hinge rods are the primary structure for connecting the links of adjacent rows together, the tension forces which are transmitted longitudinally of the belt are transmitted from the links of one row through the connecting rod to the links of the adjacent rows, and hence the rods are subjected to severe stresses. With conveyor belts of this type, it is necessary to make the rods of high alloy steels and of maximum cross-sectional diameter in order to withstand the stresses imposed thereon, and this hence makes such conveyor belts very costly to manufacture. In addition, the belts of this type have commonly experienced failure due to the hinge rods being distorted as a result of the substantial stresses imposed thereon, which failure often is referred to as "crank-shafting".

To avoid the problems and disadvantages associated with conveyor belts of the above type wherein the connecting rod is a highly loaded and stressed member, there is also known a conventional conveyor chain wherein the metal links themselves are provided with trunnions on one end which hingedly interfit within a hinge portion provided on the other end of an adjacent link so that the transfer of stresses along the chain occurs directly from link-to-link, whereby the connecting rods are provided solely as a means of retaining the hingedly connected links together. A chain of this general type is illustrated in U.S. Pat. No. 2 681 728 issued to F. J. Boron.

The metal link of the aforesaid Boron patent has a pair of hinge portions disposed at opposite ends of the link, which hinge portions are joined together by vertically spaced top and bottom plates which extend in substantially parallel relationships, with the region between said top and bottom plates being substantially open. The hinge portions at opposite ends of the link constitute only a partial cylindrical shape since the region disposed directly between the top and bottom plates is open. One of the hinge portions has a pair of sleevelike trunnions of reduced diameter associated therewith, which trunnions project outwardly from opposite sides of the hinge portions so as to hingedly interfit within the hinge portions associated with the other ends of the links of the next adjacent row, whereby the hingedly interfitting relationship of the trunnions into the hinge portions of the adjacent links provides a direct pivotal connection between the links of adjacent rows and also permits a direct force and load transfer therebetween. While a connecting rod does extend through the aligned hinge portions, nevertheless the intent of this rod is not as a load or stress transmitting member.

While the arrangement of the Boron patent, as described above, initially appears to possess desirable features, nevertheless experience with the Boron structure, and a more detailed analysis thereof, indicates that the Boron link possesses structural and functional problems which are disadvantageous. For example, due to the direct transfer of tension loads between the links of adjacent rows, the tension loads are imposed against the innermost sides of the trunnions, which loads are directed longitudinally outwardly so that the two trunnions are loaded in such manner that they tend to bend inwardly toward one another. Further, since the inner wall of the hinge portion is removed so as to open inwardly into the body of the link between the top and bottom plates, there is no strong structural member joined between the inner walls of the trunnions, and this thus creates a structural weakness which is believed to result in distorion and hence failure of the link due to the manner in which the trunnions are structurally coupled to the link. In addition, the Boron link has been observed to undesirably permit the articles being conveyed, specifically small articles, to become trapped between the upper and lower plates of the link body due to the substantial open space therebetween.

Due to the structural weakness in the aforementioned Boron link created by the opening between the trunnion-bearing hinge portion and the main link body, the Boron link was modified to eliminate this opening by forming the trunnion-bearing hinge portion as a solid sleeve. While this improved the strength of the link, nevertheless it has been observed that this modified Boron link experienced failure of a different type. More specifically, due to the very hostile environment in which conveyors of this type are used, the chain links are inevitably exposed to deposits, particularly carbon deposits. Further, with the increased usage of various types of high alloy steel, and the various types of heat treating and hardening processes, the conveyor belts are increasingly exposed to nickel and chrome oxides, and other types of precipitates. These deposits, oxides and precipitates, due to the clearance between the connecting rods and the hinge portions of the links, move into and fill up these clearance spaces such that, after several months of operation, the clearance space becomes completely filled with deposits such that the link hinge portion and the connecting rod effectively become swedged together and hence do not pivot with respect to one another, whereupon the rod then usually fails due to excessive torsional stress. In fact, not only have failures of this type been frequently observed, but it has been discovered that oftentimes the rods can not even be removed so as to permit replacement and repair of the links. This problem of collection of deposits has been a common problem with the modified Boron link inasmuch as the deposits enter into the space between the rod and the hinge portion of the link, which space can be accessed solely from the open ends of the trunnions, whereupon the deposits become trapped within the clearance space and thus ultimately create a swedging of the rod and link together. Further, with this modified Boron link, it is extremely difficult to oxidize the carbon deposits by exposure to oxygen since it is impossible to obtain full flow of oxygen into the clearance space, and hence oxidation of the carbon, due to the very limited access provided at the free ends of the trunnions.

This modified Boron link has hence experienced rather severe failures due to the entrapment of deposits, and the ultimate swedging of the links and rods together. Also, this modified link still has parallel upper and lower plates provided with an open space therebetween, which space permits small articles to be trapped therebetween.

There has also been developed a variation of the aforesaid modified Boron link, which variation is identical to the modified link except that the bottom plate is eliminated and replaced with a single platelike vertical rib fixed to and projecting downwardly from the top plate, which rib extends longitudinally of the link and integrally joins to the hinge portions adjacent the midpoints thereof. While this link eliminates the open space between the top and bottom plates associated with the modified Boron link, nevertheless this link variation results in the pocket between the ribs of sidewardly adjacent links being about three inches wide, whereas the tooth width on the conventional driving sprocket is only about one inch wide, so that the belt formed from these links experiences substantial sideward wandering relative to the sprocket wheels, which wandering is sufficient to often cause interference with the sidewalls of the chutes used for supplying the articles to or removing the articles from the conveyor belt.

Still further, this last-mentioned link variation has undesirably low strength when subjected to tensile stresses in the longitudinal direction of the chain, and in fact the link has been observed to pull apart when subject to a stress of about 19,000 psi. This link variation also has been observed to undergo substantial stretch or elongation under load such that, when a chain involving this link has been in use for about six months, oftentimes it has been observed that the chain has stretched up to eight inches, and hence the conveyor must be shut down so as to permit removal of several links to eliminate the undesirable slack. This link variation also has been observed to undergo stress failure at the sharp corner where the top plate merges with the hinge portions. Still further, this link variation utilizes hinge portions which are effectively closed in the same manner as in the modified Boron link, and thus this conveyor belt also experiences entrapment of deposits between the hinge portion and the connecting rod which ultimately result in swedging of the rod to the link, which in turn results in torsional failure of the rod.

Accordingly, the present invention relates to an improved metal link for a conveyor belt of the aforesaid type, which metal link significantly improves upon and, in some cases, effectively overcomes many of the disadvantages associated with the known trunnion-type metal links as described above.

More specifically, it is an object of the present invention to provide an improved conveyor belt of the type utilizing metal links and designed specifically for use with heat treatment furnaces, which conveyor belt is believed to significantly reduce the probability of belt failures of the type which have been long standing in this technology, and which have persisted even though numerous attempts have been made to overcome these failures.

A further object of this invention is to provide an improved conveyor belt, as aforesaid, employing an improved cast metal link of the trunnion type whereby the hinge portion associated with the trailing end of the link has outwardly projecting trunnions on both sides thereof and defines a smaller-diameter opening therethrough for the connecting rod, whereby the hinge portion at the leading end of the link has a larger-diameter opening therethrough for accommodating the trunnions, whereby the link has a main body formed as an elongated tube which extends longitudinally of the link and rigidly and integrally joins to the hinge portions, and whereby the pivotal body is hollow and the interior thereof communicates with the openings through the hinge portions to permit deposits within the hinge portions to move into the interior of the body to minimize collection of deposits between the hinge portions and the connecting rods to minimize swedging together of the rods and links.

A still further object of this invention is to provide an improved conveyor belt link, as aforesaid, which has substantially increased strength in relationship to the known links described above, which accomplishes this substantial increase in strength with only a minimal and hence negligible increase in weight, and which substantially minimizes or eliminates the problem of belt stretch which has been observed in many of the known belts.

Another object of this invention is to provide an improved belt link, as aforesaid, which, by provision of the substantially closed tubular body, prevents articles from being trapped or engaged with or between the links, which preserves the minimum width pockets between sidewardly adjacent links so as to more closely accommodate the sprocket wheel teeth and hence prevent sideward wandering of the belt, and which additionally has a small access opening in the bottom of the tubular body to permit oxygen or other gases to enter into the interior of the body and thence into the hinge portions when oxidation of the carbon deposits is desired so as to provide increased access to the deposits within the hinge portions of the links.

Still another object of the invention is to provide an improved conveyor belt link, as aforesaid, which incorporates an internal rib which extends circumferentially around the outer wall of the hinge portion associated with the front end of the link, namely that hinge portion which has the largest diameter opening therethrough, which rib is positionable in the space between the trunnions which project into the hinge portion from opposite ends thereof, whereby the rib significantly strengthens this hinge portion of the link so prevent stretching or weakening of the link due not only to the thinner section associated with this hinge portion, but due also to the wear which generally occurs on this hinge portion due to the sliding of same along skid tiles during the return movement of the belt along the lower belt reach.

In the conveyor belt of this invention, the improved metal link in its preferred embodiment includes an elongated tubular body which extends in a longitudinal direction of the link and has a hollow interior. This tubular body includes a substantially planar top wall and a pair of substantially parallel sidewalls projecting downwardly therefrom. The top wall has substantially planar wings which are continuous with the top wall and project outwardly beyond the sidewalls of the body to form an enlarged upper support surface. These wings result in the sidewardly adjacent links defining a substantially continuous support surface for articles. The body, at its forward end, defines a front hinge portion which is defined by an opening which extends transversely through the sidewalls of the body, which opening is defined by a substantially semi-cylindrical end wall which extends between and is substantially continuous with the top and bottom walls of the body. This end wall preferably has a strengthening rib which projects inwardly therefrom and around the circumference thereof substantially midway between the opposite ends of the opening. This opening also is in communication with the hollow interior of the body. A rear hinge portion is also formed at the other end of the tubular body and defines an opening which extends transversely of the body in substantially parallel relationship to the opening defined in the front hinge portion. The opening through the rear hinge portion is of smaller diameter than the opening in the front hinge portion. The opening in the rear hinge portion is again defined by a substantially semi-cylindrical wall which extends between and integrally joins the top and bottom walls of the tubular body, and the interior of this opening is in communication with the hollow interior of the body. The rear hinge portion includes a pair of substantially cylindrical trunnions which are aligned with the rear opening and project outwardly from opposite sides of the body so that the rear opening extends through the trunnions. The trunnions have an outer diameter which is slightly smaller than the diameter of the front opening so as to be positionable in the front openings of two adjacent similar links. Elongated connecting rods extend through the rear openings of links aligned in sidewardly extending rows to provide structural connection of the links, which links have the trunnions thereof structurally and pivotally supported within the front openings of the links in the next adjacent row.

Other objects and purposes of the invention will be apparent to persons familiar with conveyor belts of this general type upon reading the following specification and inspecting the accompanying drawings.

Figure 4:
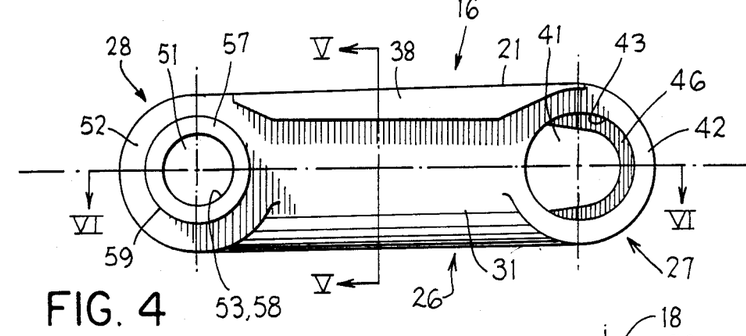
FIG. 4 is a side elevational view of the link shown in FIG. 3.
Figure 5:
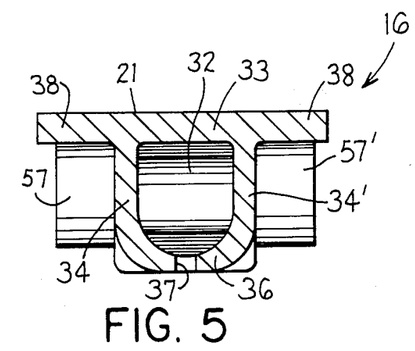
FIGS. 5 and 6 are sectional views taken respectively along the lines V—V and VI—VI in FIG. 4.

Certain terminology will be used in the following description for convenience in reference only and will not be limiting. For example, the words "upwardly", "downwardly", "rightwardly" and "leftwardly" will refer to directions in the drawings to which reference is made. The word "upper" will also have reference to the upper support surface of the link when it is disposed in the upper reach of the conveyor belt, substantially as illustrated in FIGS. 4 and 5. The words "inwardly" and "outwardly" will refer to directions toward and away from, respectively, the geometric center of the link, the conveyor belt and designated parts thereof. Said terminology will include the words specifically mentioned, derivatives thereof and words of similar import.

DETAILED DESCRIPTION

Figure 1:
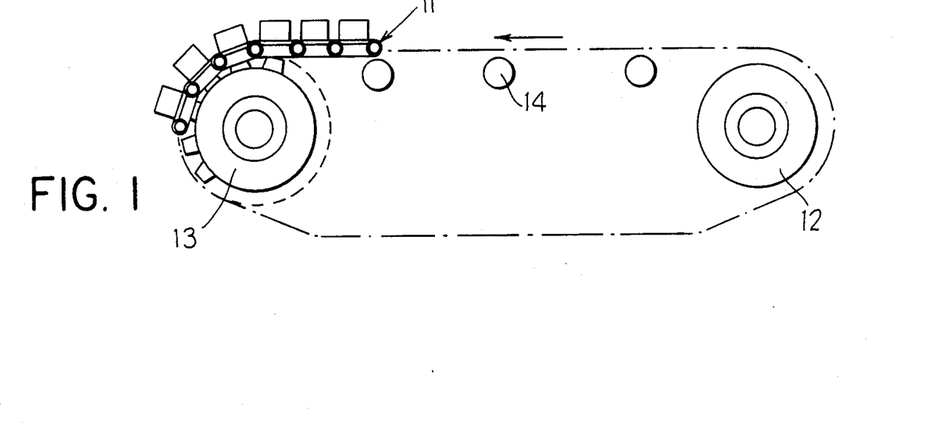
FIG. 1 is a schematic elevational representation of a conventional conveyor belt of the type constructed from a plurality of metal links.
Figure 2:
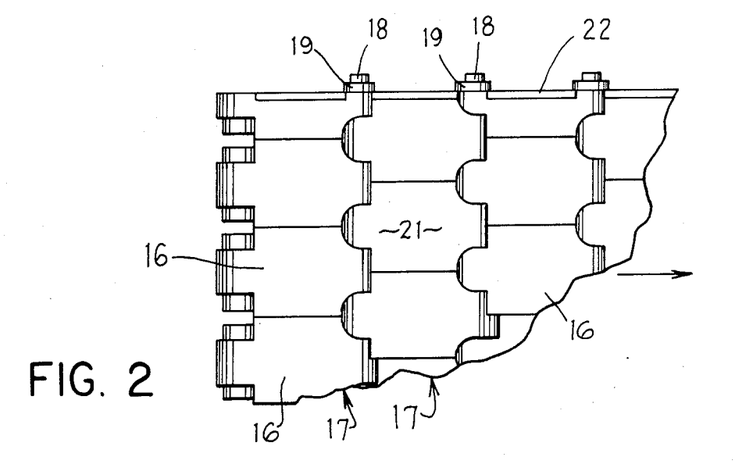
FIG. 2 is a fragmentary plan view of the conveyor belt illustrating the manner in which the metal links are conventionally joined together by transversely extending rods.

Referring to FIGS. 1 and 2, there is illustrated a conventional conveyor belt assembly 10 of the type used for transporting objects through a heat treatment furnace. This assembly includes a substantially endless belt 11 supported on and extending between a pair of rotatable toothed drums, namely a take-up drum 12 and a drive drum 13, the latter being connected to a suitable drive source. A plurality of intermediate idler rollers 14 normally cooperate with at least the upper reach of the belt to assist in supporting same.

The endless belt 11, as illustrated by FIG. 2, is formed from a large number of metal links 16 disposed within adjacent and substantially parallel rows 17 which extend transversely across the width of the belt. The links within the adjacent rows are staggered or offset with respect to one another so that the adjacent ends of the links, which links are of a generally cruciform shape, can be interleafed in substantially the same manner as a piano-type hinge. The links in adjacent rows are suitably joined together by elongated connecting pins or rods 18 extending transversely of the belt, which rods have washers 19 secured on the opposite ends thereof, as by welding.

Considering now the link 16 according to the present invention, and referring specifically to FIGS. 3-6, this link includes a central body portion 26 which is elongated in the longitudinal direction of the link and has front and rear hinge portions 27 and 28, respectively, integrally formed at opposite ends thereof. The link 16 is preferably integrally formed in one piece, such as by being cast, of a suitable metal, such as a high-strength heat-resistant alloy steel.

The main or central body portion 26 is formed by an elongated tubular structure 31 which has a substantially closed sidewall and which defines therein a hollow interior 32. The tubular structure 31 includes a substantially planar top wall 33 and a pair of spaced and substantially parallel sidewalls 34-34' which are integral with and project perpendicularly downwardly from the top wall 33. The lower edges of the sidewalls 34-34' are integrally joined together by a bottom wall 36, the latter preferably being joined to the sidewalls by suitable rounded corners to facilitate casting. This bottom wall 36 has, substantially in the center thereof, a small elongated slot 37 extending therethrough and in communication with the hollow interior 32.

The link 16 also has a pair of substantially planar platelike wings 38 which are coplanar and continuous with the top wall 33 and project sidewardly beyond the respective sidewalls 34—34'. These wings 38 and the top wall 33 hence define an enlarged upper support surface 21 for supporting thereon the conveyed objects. Further, these wings 38, when several said links 16 are disposed in a sidewardly extending row 17, result in a substantially continuous support surface due to the wings on adjacent links being positioned in closely adjacent relationship.

With respect to the hinge portion 27 provided at the front or leading end of the link 16, this hinge portion 27 defines a front opening 41 which extends transversely of the tubular structure 31 adjacent the front end thereof, which opening 41 is effectively defined by a substantially semi-cylindrical front end wall 42 which extends between and is integrally joined to the top and bottom walls 33 and 36, respectively. This front end wall 42 defines therein an inner surface 43 which is generated substantially about the longitudinal axis 44 of the opening 41, which inner surface 43 is preferably machined so as to define a smooth semi-cylindrical bearing surface.

Figure 6:
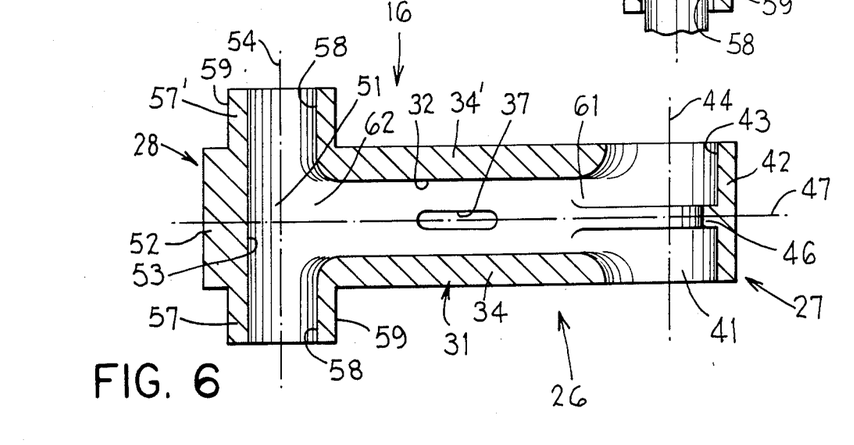

Due to the diameter of the opening 41, the end wall 42 typically has the smallest wall thickness of the link. Hence, this end wall 42 is preferably provided with a strengthening rib 46 which projects inwardly thereof as illustrated in FIG. 6. This strengthening rib 46 is preferably disposed substantially on the central plane 47 of the link and extends not only around the semi-cylindrical end wall 42, but also projects rearwardly along the inner surfaces of both the top and bottom walls through an extent at least equal to the effective diameter of the opening 41 so as to effectively strengthen the hinge portion 27.

Figure 3:
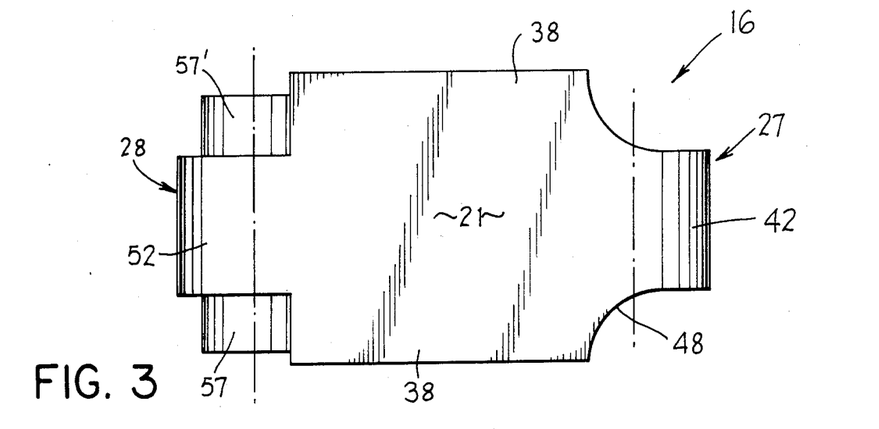
FIG. 3 is a plan view of the improved metal link according to the present invention.

The front hinge portion 27 is further strengthened by providing the wings 38, where they merge with the top wall 33 and end wall 42, with rounded corners 48 (FIG. 3).

The rear hinge portion 28 is similarly constructed in that it includes an opening 51 which extends transversely through the rearward end of the tube 31 and is defined by a substantially semi-cylindrical rear end wall 52 which extends between and integrally joins to the top and bottom walls 33 and 36, respectively. This rear end wall 52 defines thereon an inner surface 53 which is generated about the longitudinal axis 54 of the opening 51, which surface 53 is preferably machined to provide a smooth bearing surface such as for supportive and pivotal engagement with the connecting rod 18.

The rear hinge portion 28 also includes a pair of substantially identical trunnions 57—57' which project outwardly from opposite sides of the tubular body 31. These trunnions 57—57' effectively comprise tubular stub shafts which are aligned with and effectively constitute extensions of the rear opening 51, and in fact the trunnions have inner surfaces 58 which are also suitably machined to form smooth cylindrical bearing surfaces and which effectively constitute an extension of the surface 53. The trunnions 57—57' also have an outer cylindrical bearing surface 59 which is also suitably machined so as to be smooth and concentric with respect to the axis 54.

The rear opening 51 has a diameter which only slightly exceeds the external diameter of the connecting rod 18 so as to permit a pivotal engagement of the rod within the rear hinge portion while providing minimal clearance therebetween. This rear opening 51, however, is of a diameter which is substantially smaller than the diameter of the front opening 42, which latter diameter is effectively defined by the inner bearing surface 43. This inner bearing surface 43 of the front opening 41 is adapted to pivotally support the outer bearing surface 59 formed on the trunnions, and hence the outer diameter of the trunnions 57—57' are only slightly smaller than the diameter of the front opening 41.

The hollow interior 32 of the tubular body 31 communicates, at opposite ends thereof, with the respective front and rear openings 41 and 51. More specifically, the hollow interior 32 communicates with the front opening 41 at the region 61, and similarly communicates with the rear opening 51 at the region 62. This communication with the central part of the openings 41 and 51 is highly desirable since it permits deposits which collect within the openings to move into the interior 32 to hence minimize the swedging of the rods and links together, and also facilitates the flow of oxygen through the slot 37 and thence through the interior 32 into the central parts of the openings 41 and 51 when oxidation of the carbon deposits is desired.

Figure 7:
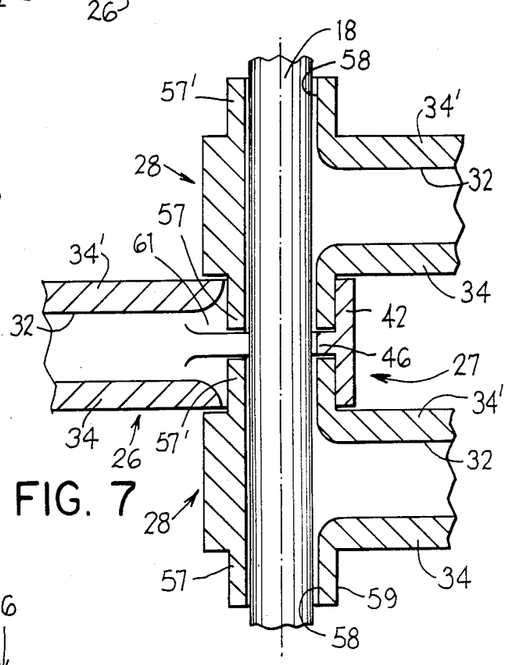
FIG. 7 is a fragmentary sectional view illustrating the manner in which the front end on the link in one row pivotally engages the rear ends of a pair of adjacent links in the next adjacent row.

When the links 16 are assembled to form the conveyor belt, the trunnion 57 of a leading link slidably projects into one end of the opening 41 associated with a first trailing link, and the other trunnion 57' on the leading link slidably projects into the other end of the front opening 41 associated with the sidewardly adjacent trailing link, substantially as illustrated in FIG. 7. Hence, the links of adjacent rows are directly structurally and pivotally connected together independently of the connecting rod 18, although this latter rod structurally ties the links together so as to prevent sideward separation. The trunnions project into the opening 41 through a distance which is less than one-half the axial length of the respective opening, whereupon the strengthening rib 46 hence occupies a portion of the region between the free ends of the axially opposed trunnions of sidewardly adjacent links. With this arrangement as illustrated by FIG. 7, the accessibility to the open interiors 32 of the links, coupled with the accessibility from the ends of the openings, hence minimizes the entrapment of deposits since such deposits can more readily and freely flow into the hollow interiors 32 so as to prevent the clearance spaces from filling with deposits. This also greatly facilitates the flow of oxygen into and intimately around the various pivotal relationships between the links and the connecting rods so as to permit more effective removal of carbon deposits by oxidation. At the same time, even though each of the front and rear openings is in open communication with the hollow interior 32, nevertheless the opposed sidewalls 34—34' of the tubular body 31 effectively provide a very strong and rigid support for the trunnions inasmuch as these sidewalls cooperate with the respective end walls so as to provide a substantially complete annular or circumferential support around the entire periphery of the trunnion adjacent its inner end.

In experimental tests carried out with the link of the present invention, it has been experimentally determined that the link of this invention has a pull-apart strength of approximately 28,000 psi, whereas conventional links as hereinabove described have a pull-apart strength of only about 19,000 psi. In addition, the link of this invention weighs only approximately 2.3 pounds in comparison to a weight of about 2.2 pounds for the conventional hereinabove described links. Thus, the link of this invention has provided an approximately 50% increase in tensile strength while requiring approximately only a 5% increase in weight. This improved link, and the conveyor belt formed therefrom, has substantially eliminated the stretching problem which occurred in prior known belts, and has also greatly minimized the seizing or swedging problems caused from accumulation of deposits.

Figure 8:
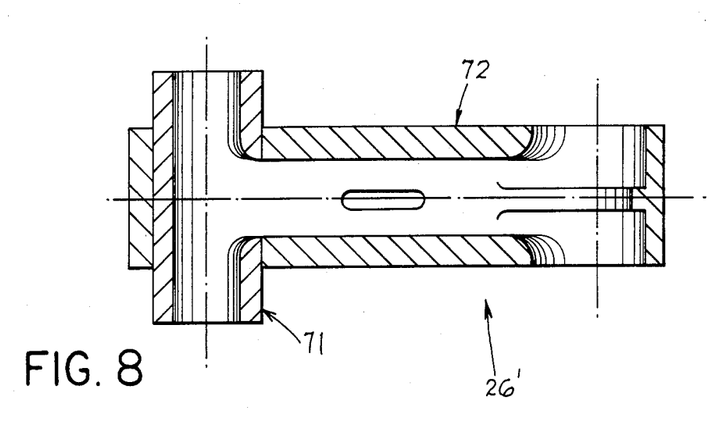
FIG. 8 is a sectional view similar to FIG. 6 but illustrating a variation.

Referring to FIG. 8, there is illustrated a variation of the link 26' of this invention, which variation has basically the same functional and geometrical characteristics as is evident from comparison of FIGS. 6 and 8. However, in this variation, rather than integrally casting the entire link at one time, the trunnions 57—57' are preferably initially precast as a single one-piece tubular member 71. Thereafter, the remaining body of the link, as designated 72, is cast around the tubular trunnion member 71. This two-step casting operation still results in the link 26' being basically of a one-piece cast arrangement since the two-step casting operation results in the body 72 and tubular member 71 being fused together. By utilizing this two-step casting procedure, the tubular member 71 and cast body 72 can be cast of different materials. The tubular member 71 is preferably cast of a high chrome-nickel steel alloy containing both cobalt and tungsten, whereas the main body 72 is preferably cast of a low chrome-nickel steel alloy. The low chrome-nickel alloy of the main body 72 is substantially less expensive than the high chrome-nickel alloy of the trunnion member 72. However, the high chrome-nickel alloy of the trunnion member 72 has some natural lubricity due to the inclusion of the cobalt and increased wear resistance due to the inclusion of the tungsten, and such higher chrome-nickel alloys have been observed to generally have increased resistance to galling and wear. Thus, the higher chrome-nickel alloy of the trunnions is hence pivotally supported within the lower chrome-nickel alloy forming the pivot structure at the forward end of the cast links, whereby dissimilar materials are disposed in pivotal engagement with one another, and substantially improved wear characteristics can thus be achieved. At the same time, this improved wear characteristic is achieved while still permitting utilization of a majority of lower chrome-nickel alloy for forming the link.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A one-piece, cast metal link for a conveyor belt as used in heat treating furnaces and the like, comprising:
a central body portion defined by an elongated tubular body which has a closed tubular wall structure defining therein a hollow interior, said tubular wall structure including a substantially planar top wall, a pair of sidewardly spaced sidewalls which are fixed to and project downwardly from the top wall, and a bottom wall which extends between and is fixedly joined to the lower edges of the sidewalls, one of said walls having a small opening formed therethrough for communication with said hollow interior to permit flow of oxygen into said interior;
a first hinge portion fixedly joined to said tubular body at one end thereof, said first hinge portion including a substantially semi-cylindrical first end wall which fixedly extends between said top and bottom walls, said first end wall and said sidewalls cooperating to define a first substantially cylindrical opening which extends transversely of said link in substantially perpendicular relationship to the longitudinal direction thereof, said first opening having a longitudinal axis which extends substantially parallel with the upper surface of said top wall, said first opening being open at opposite ends thereof and accessible from opposite sides of said link, and the hollow interior of said tubular body being in open communication with a central part of said first opening;
a second hinge portion fixedly joined to said tubular body adjacent the other end thereof, said second hinge portion including a second substantially semi-cylindrical end wall which is fixedly joined between said top and bottom walls, said second end wall and said sidewalls cooperating to define a second substantially cylindrical opening which extends transversely of said link and defines a longitudinal axis which extends substantially parallel with the longitudinal axis of said first opening, said hollow interior of said tubular body being in open communication with a central part of said second opening:
said second hinge portion including a pair of cylindrical sleevelike trunnions coaxially aligned with said second opening and projecting outwardly from opposite sides of said tubular body, said trunnions having said second opening projecting outwardly therethrough, said trunnions at their inner ends being fixedly joined to said second end wall and the respectively adjacent sidewall, said trunnions defining thereon as outer cylindrical bearing surface having a diameter which approximates the diameter of said first opening; and
a pair of platelike, planar wings fixed to said top wall in substantially coplanar relationship therewith and projecting outwardly from opposite sides thereof beyond the respective sidewall, and said small opening being positioned below said wings.

2. A link according to claim 1, wherein said small opening comprises a small elongated slot formed through said bottom wall, said slot being elongated in the longitudinal direction of said tubular body.

3. A link according to claim 1, wherein said first end wall has a radially inwardly projecting rib formed integrally therewith and extending circumferentially thereof, said rib being of narrow axial width and being positioned substantially on the central plane of the link, said rib extending along the interior of said first end wall and then along the inner surfaces of the top and bottom walls through an extent at least equal to the diameter of the first opening.

4. A link according to claim 3, wherein said small opening comprises a small elongated slot formed through said bottom wall, said slot being elongated in the longitudinal direction of said tubular body.

5. A link according to claim 4, wherein the wing joins to the first end wall through a rounded corner generated on a large radius.

6. A link according to claim 1, wherein said pair of sleevelike trunnions are formed by and define the opposite ends of a precast tubular member formed of a high chrome-nickel alloy steel, and wherein the remainder of said metal link is cast around said tubular member and is formed of a low chrome-nickel alloy steel, said second end wall and said central body portion being a part of the remainder of said link which is cast of said low chrome-nickel alloy steel, said second end wall being cast around said tubular member as a preform and fused thereto during the casting operation.

7. A link according to claim 1, wherein said link is integrally cast in its entirety in one casting operation so as to be an integral one-piece structure.

8. In a conveyor belt for a heat treating furnace and having a plurality of cast metallic links of a cruciform shape, said links being arranged in a plurality of adjacent rows which extend transversely across the width of the belt, each row containing plural links therein disposed in closely adjacent side-by-side relationship, the links in the adjacent rows being transversely staggered so as to positionally interfit with one another, the links having dissimilar front and rear hinge portions with the rear hinge portion including a pair of trunnions which project outwardly in opposite directions from opposite sides of the respective link, the trunnions associated with the rearward end of a link in one row being pivotally and supportively engaged within the front hinge portions associated with a pair of sidewardly adjacent links in the adjacent trailing row, and a plurality of elongated connecting rods extending transversely of the belt through the pivotally connected hinge portions for joining the links together, the improvement wherein said cast metal link comprises:

a central body portion defined by an elongated tubular body which has a closed tubular wall structure defining therein a hollow interior, said tubular wall structure including a substantially planar top wall, a pair of sidewardly spaced sidewalls which are fixed to and project downwardly from the top wall, and a bottom wall which extends between and is fixedly joined to the lower edges of the sidewalls, one of said walls having a small opening formed therethrough for communication with said hollow interior to permit flow of oxygen into said interior;

said front hinge portion being integrally joined to said tubular body at one end thereof, said front hinge portion including a substantially semi-cylindrical front end wall which integrally extends between said top and bottom walls, said front end wall and said sidewalls cooperating to define a first substantially cylindrical opening which extends transversely of said link in substantially perpendicular relationship to the longitudinal direction thereof, said first opening having a longitudinal axis which extends substantially parallel with the upper surface of said top wall, said first opening being open at opposite ends thereof and accessible from opposite sides of said link, and the hollow interior of said tubular body being in open communication with a central part of said first opening;

said rear hinge portion being fixedly and integrally joined to said tubular body adjacent the other end thereof, said rear hinge portion including a rear substantially semi-cylindrical end wall which is fixedly and integrally joined between said top and bottom walls, said rear end wall and said sidewalls cooperating to define a second substantially cylindrical opening which extends transversely of said link and defines a longitudinal axis which extends substantially parallel with the longitudinal axis of said first opening, said hollow interior of said tubular body being in open communication with a central part of said second opening;

said rear hinge portion having said pair of cylindrical sleevelike trunnions coaxially aligned with said first opening and projecting outwardly from opposite sides of said tubular body, said trunnions having said first opening projecting outwardly therethrough, said trunnions at their inner ends being integrally joined to said second end wall and the respective sidewall, said trunnions defining thereon an outer cylindrical bearing surface having a diameter which approximates the diameter of said first opening; and a pair of platelike, planar wings fixed to said top wall in substantially coplanar relationship therewith and projecting outwardly from opposite sides thereof beyond the respective sidewall;

said link as disposed on one row having the trunnions thereof rotatably supported within the opposed front hinge portions of a pair of said links as disposed in adjacent relationship within the next adjacent row, said small opening permitting oxygen to flow therethrough into the hollow interior of the tubular body, and said oxygen then flowing longitudinally along the interior body into the first and second openings for communication with the interiors thereof and for communication with the regions surrounding the trunnions as disposed within the first opening to facilitate removal of deposits.

9. A conveyor belt according to claim 8, wherein said small opening comprises a small elongated slot formed through said bottom wall, said slot being elongated in the longitudinal direction of said tubular body.

10. A belt according to claim 8, wherein said front end wall has a radially inwardly projecting rib formed integrally therewith and extending circumferentially thereof, said rib being of narrow axial width and being positioned substantially on the central plane of the link, said rib extending along the interior of said front end wall and then along the inner surfaces of the top and bottom walls through an extent at least equal to the diameter of the first opening, said trunnions projecting axially into the respective first opening of a further said link through a distance less than one-half the axial length thereof so that the two trunnions which project into opposite ends of the respective first opening have the free ends thereof disposed in axially spaced relation, said rib being positioned within and occupying only a portion of the axial space between the free ends of the opposed trunnions to permit free flow of oxygen into the regions adjacent the free ends of the trunnions and thence into the annular regions surrounding the trunnions.

11. A belt according to claim 10, wherein said small opening comprises a small elongated slot formed through said bottom wall, said slot being elongated in the longitudinal direction of said tubular body.

12. A belt according to claim 11, wherein the wind joins to the front end wall through a rounded corner generated on a large radius.

* * * * *

UNITED STATES PATENT AND TRADEMARK OFFICE
CERTIFICATE OF CORRECTION

PATENT NO. : 4 618 056
DATED : October 21, 1986
INVENTOR(S) : Robert S. CUTSHALL It is certified that error appears in the above-identified patent and that said Letters Patent is hereby corrected as shown below:

Column 10, line 44; change "as" to ---an---.

Signed and Sealed this

Thirty-first Day of March, 1987

*Attest:*

DONALD J. QUIGG

*Attesting Officer*  *Commissioner of Patents and Trademarks*